United States Patent
Godefroid et al.

(10) Patent No.: US 6,697,840 B1
(45) Date of Patent: Feb. 24, 2004

(54) PRESENCE AWARENESS IN COLLABORATIVE SYSTEMS

(75) Inventors: Patrice Ismael Godefroid, Naperville, IL (US); James David Herbsleb, Naperville, IL (US); Lalita Jategaonkar Jagadeesan, Naperville, IL (US); Du Li, Los Angeles, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/515,737

(22) Filed: Feb. 29, 2000

(51) Int. Cl.[7] ............................................. G06F 15/16
(52) U.S. Cl. ...................... 709/205; 709/204; 709/227; 709/224
(58) Field of Search ................................ 709/205, 204, 709/220, 221, 222, 223, 224, 227, 207, 217, 225

(56) References Cited

U.S. PATENT DOCUMENTS

| | | | | |
|---|---|---|---|---|
| 5,862,330 A | * | 1/1999 | Anupam et al. | 709/204 |
| 5,894,556 A | * | 4/1999 | Grimm et al. | 709/227 |
| 6,128,660 A | * | 10/2000 | Grimm et al. | 709/227 |
| 6,148,328 A | * | 11/2000 | Cuomo et al. | 709/204 |
| 6,301,609 B1 | * | 10/2001 | Aravamudan et al. | 709/207 |
| 6,345,297 B1 | * | 2/2002 | Grimm et al. | 709/227 |
| 6,411,989 B1 | * | 6/2002 | Anupam et al. | 709/204 |
| 6,430,567 B2 | * | 8/2002 | Burridge | 707/102 |
| 6,463,471 B1 | * | 10/2002 | Dreke et al. | 709/224 |
| 6,487,583 B1 | * | 11/2002 | Harvey et al. | 709/204 |

* cited by examiner

Primary Examiner—Ario Etienne
Assistant Examiner—Abdullahi E. Salad

(57) ABSTRACT

Presence awareness initiatives are implemented in a collaborative system that enables a user to set presence awareness policies, and that provides a reasonably high assurance that the system will correctly implement those policies. Specifically, the collaborative presence awareness system is such as to enable users to specify complex presence awareness policies. The presence awareness system is also such as to have been verified by employing systematic state-space exploration tools to establish a high level of assurance that the presence awareness system has the capability to implement correctly, substantially all possible presence awareness policies. Further, in accordance with another aspect of the invention, the presence awareness policy specifications are modular relative to the rest of the presence awareness system, and can be modified without having to modify computational modules or user interface program code of the presence awareness system. In accordance with another aspect of the invention, a user has the capability to update his or her presence information. In accordance with still another aspect of the invention, the system automatically collects presence information about the user and automatically updates his or her presence information. In accordance with yet another aspect of the invention, the presence awareness system may use specification-based testing at run-time to monitor whether some users' presence awareness policies have inadvertently been violated, further strengthening the reliability of the system.

63 Claims, 6 Drawing Sheets

100

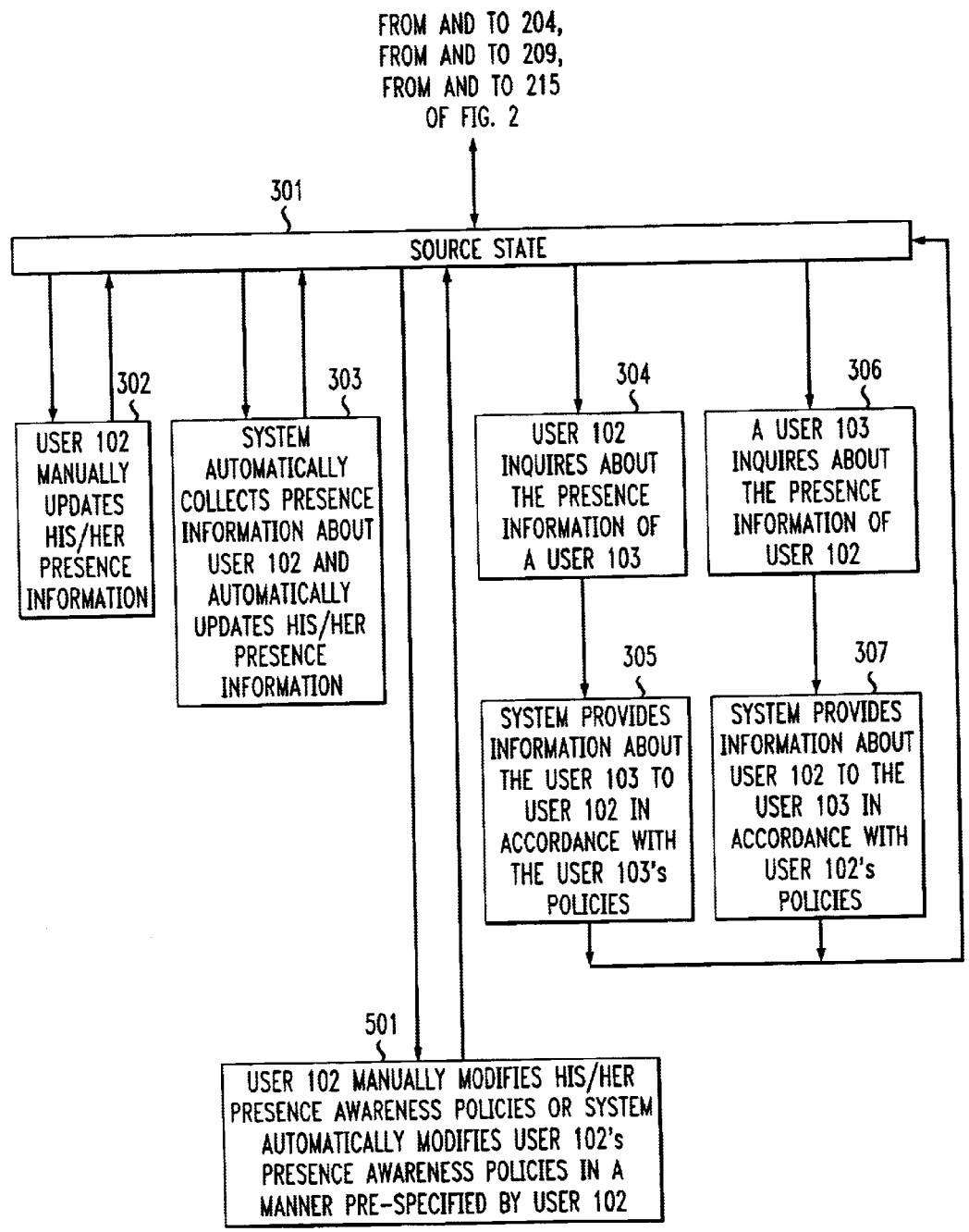

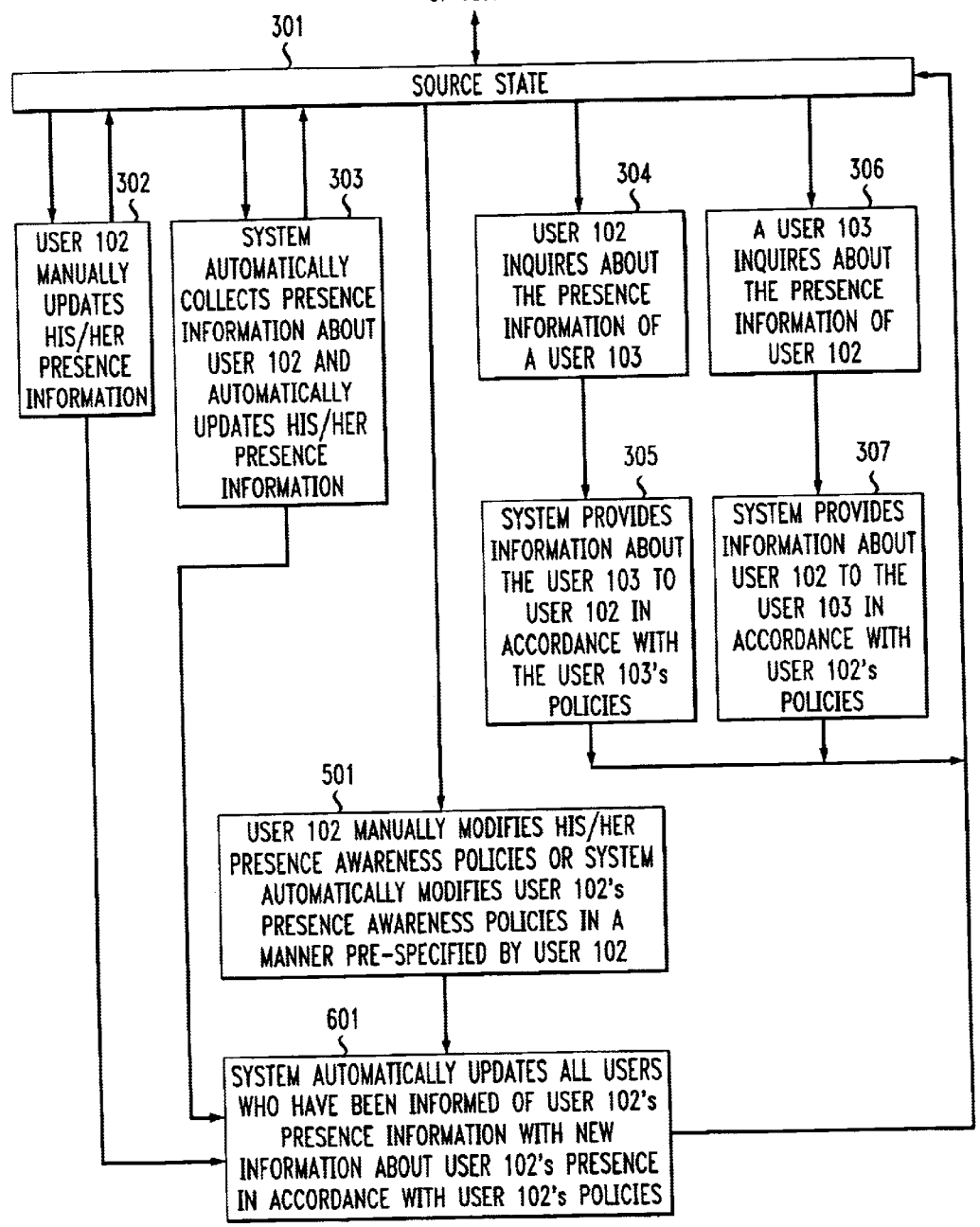

PRESENCE AWARENESS IN COLLABORATIVE SYSTEMS

TECHNICAL FIELD

This invention relates to collaborative systems and, more particularly, to presence awareness in such systems.

BACKGROUND OF THE INVENTION

The ability to convey presence awareness information is rapidly becoming an important component of collaborative system applications. Indeed, any detectable user event could conceivably have a legitimate use in some presence awareness application. However, from a user's point of view, there is a fundamental tradeoff between access to presence data for legitimate users, and concerns about privacy. Precisely to the extent that one user is able to identify what another user is doing, the user can communicate with the other user when the need arises, make his or her communications more timely and convenient for the other user, and generally be a more effective colleague or more accessible and responsive friend, acquaintance, or family member. This is the sort of information, however, that users would generally not like to provide to strangers, nor perhaps to managers, competitors, or family members and friends. Moreover, the data are largely generated automatically and potentially quite frequently, so users cannot be expected to monitor all presence events in order to ensure appropriate levels of privacy. Existing collaborative systems only offer rudimentary presence awareness information. This is because these systems cannot provide sufficient privacy and security guarantees.

SUMMARY OF THE INVENTION

Problems and limitations of prior presence awareness initiatives in collaborative systems are overcome in a presence awareness system that enables a user to set presence awareness policies, and that provides a reasonably high assurance that the presence awareness system will correctly implement those policies. Specifically, the presence awareness system is such as to enable users to specify complex presence awareness policies. The presence awareness system is also such as to have been verified by employing systematic state-space exploration tools to establish a high level of assurance that the presence awareness system has the capability to implement correctly, substantially all possible presence awareness policies. Further, in accordance with another aspect of the invention, the presence awareness policy specifications are modular relative to the rest of the presence awareness system, and can be modified without having to modify computational modules or user interface program code of the presence awareness system.

In accordance with another aspect of the invention, a user has the capability to update his or her presence information.

In accordance with still another aspect of the invention, the presence awareness system automatically collects presence information about the user and automatically updates his or her presence information.

In accordance with yet another aspect of the invention, the presence awareness system may use specification-based testing at run-time to monitor whether some users' presence awareness policies have inadvertently been violated, further strengthening the reliability of the system.

BRIEF DESCRIPTION OF THE DRAWING

FIG. 5 is a flow diagram illustrating steps of possible processes which may be employed in the embodiments of FIG. 2; and FIG. 6 is a flow diagram illustrating steps of possible processes that may be employed in the embodiments of FIG. 2.

DETAILED DESCRIPTION

Figure 1:
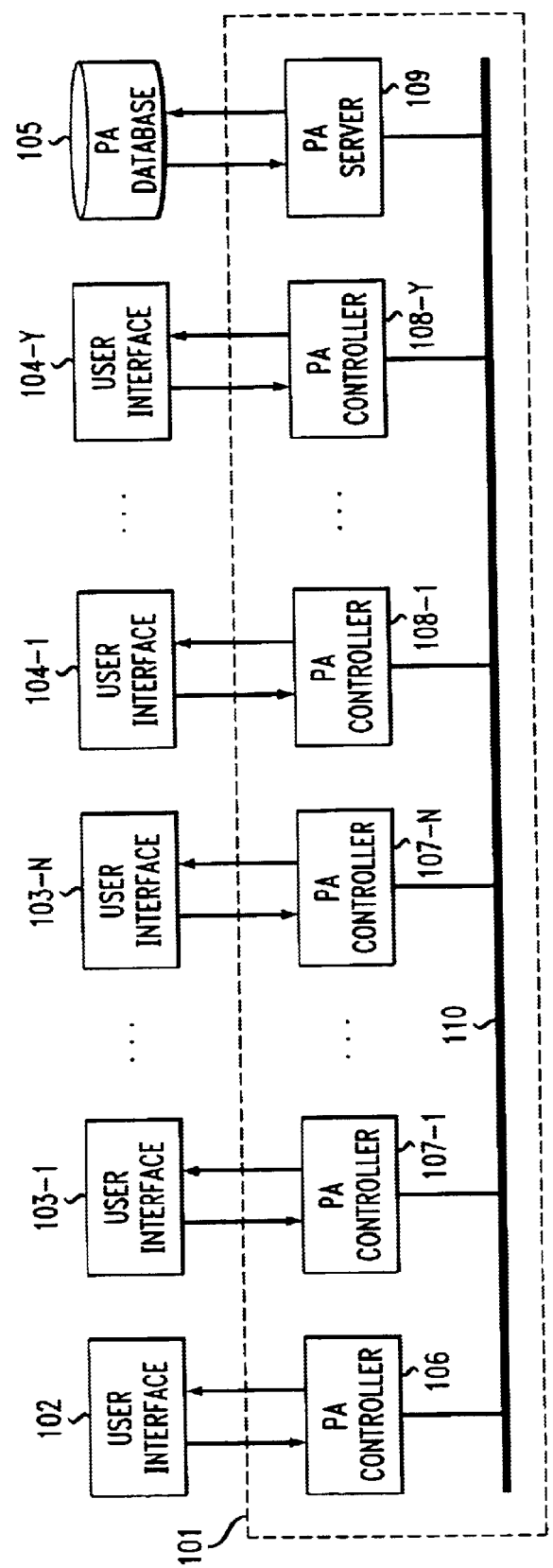
FIG. 1 shows, in simplified block diagram form, details of a collaborative communications system in which the invention may advantageously be employed.

At the outset it is felt best to highlight some issues regarding presence awareness. The ability to convey "presence awareness" is rapidly becoming an important component of many collaborative applications. For example, many calendar programs support sharing, so that coworkers can see when others are busy, or even see the contents of others' calendar entries. This detailed information can be extremely valuable for quickly locating colleagues, or for reviewing agendas of ongoing meetings to stay abreast of current issues and decisions.

Awareness information is particularly important for large, global organizations. In geographically distributed software development, for example, one of the most serious problems is the time it takes to resolve issues involving people at more than one site. Presence information could go a long way toward alleviating problems like phone tag by informing distant colleagues about who is actually available, and when.

Similarly, simple kinds of presence awareness (as in by AOL Instant Messenger) have gained tremendous popularity in the general population. For example, teenagers actively use these features to communicate with friends. Family members use these features to communicate with relatives that live elsewhere.

Many kinds of data can be used by current applications for presence awareness purposes, including whether a person is logged on (as in AOL Instant Messenger), audio and video of varying resolution, location information, and information about current environment (e.g., has the screen saver engaged, what web site is the user currently browsing, what file is currently being edited). Many kinds of "presence" data are generated automatically by the user's activities. Applications will be able to take advantage of additional sources of information as networks move toward convergence, i.e., carrying telephony and video, as well as, data from networked applications. Nearly any detectable event could conceivably find a legitimate use in some "presence aware" application.

From the users' point of view, there is a fundamental tradeoff between access to presence data for legitimate uses, and concerns about privacy. Precisely to the extent that a user A is able to identify what another user B is doing, user A can communicate with user B when the need arises, make his/her communications more timely and convenient for user B, and generally be a more effective colleague, or more accessible or responsive friend or family member. This is the sort of information, however, that users would generally not like to provide to strangers, nor perhaps to managers, competitors, or friends and family members. Moreover, the data are largely generated automatically and potentially quite frequently, so users cannot be expected to monitor all presence events in order to ensure appropriate levels of privacy.

There are similar issues, of course, in managing access privileges more generally, for example in a file system.

While implementations vary considerably, a good solution is conceptually quite simple. Each user has control over their own data, and the ability to determine what, if anything is available to other individuals, groups, or even roles. In a similar way, one could specify the availability of the various types of "presence" data. Presence awareness data in collaborative applications, however, presents several software engineering challenges that evade such solutions.

Policies regarding access to data in collaborative applications have subtle complexities, and the data to which they are applied are highly dynamic. For example, applications such as NetMeeting allow everyone in an application-sharing collaborative session to see many windows open on one user's (user 1) desktop. It may be the case that this user has permission to view certain "presence" data about another user (user 2), for example, current phone activity, current location, calendar entries, or the contents of a chat window. If this is displayed on user 1's desktop, it may inadvertently be made available to everyone else in the application sharing session, even if the other participants do not have the correct access privileges. One might call this a violation of a"non-transitivity" policy.

Another example of the subtleties of these policies comes from the practice of "lurking", i.e., listening and/or viewing without otherwise participating, and perhaps without others' knowledge. This may often be desirable, for example, allowing students to observe ongoing scientific data collection and analysis activities and the accompanying conversation first hand. In other situations, it may be considered rude or even threatening to allow a user to acquire data about other users that he or she does not permit them to acquire data about him or her. One would like to be able to define a complex presence awareness policy, for example, of "mandatory reciprocity," which would allow user 1 to access information concerning user 2 only if user 1 allows user 2 to access the same data about user 1.

It is desirable to be able to specify complex presence awareness policies. For example, such complex presence awareness policies may include fine-grained privileges, mandatory reciprocity, non-transitivity or the like. Fine-grained privileges are, for example:

A user "A" can explicitly or implicitly set access privileges to other users on an individual or group basis. The access privileges and presence information to individual ones or groups of other users may differ. For example, user "B" may have access to user A's real name, while user "C" may only have access to user A's pseudonym. Importantly, neither user B nor user C can discover, via the system, the access privileges of the other. Furthermore, any user "D" can access information concerning user A or contact user A only in accordance with the access privileges explicitly or implicitly granted to user D by user A.

Mandatory Reciprocity is, for Example:

A user A can access information concerning a user B, if and only if, user A allows user B access to same information about user A, and user A can contact user B, if and only if, user A allows user B to contact user A in the same manner.

Non-transitivity, is for Example:

A user A allowing access to a user B allowing access to a user C does not necessarily imply that user A allows access to user C, i.e., user C cam access user A's information only if explicitly or implicitly allowed to do so by user A.

Policy specifications must be modular and easily modifiable during collaboration. In general, it is impossible to specify the "correct" policy in advance of actual use of a given collaborative application. Builders of collaborative tools must generally be able to try out various policies and quickly adjust them to suit the sensitivities of their user communities. Further, the desired policies may change rapidly as users gain more experience with the system. There may also be considerable variation in the policies desired by different groups of users within a single company. Moreover, a user would like to be able to add people to a session, change the level of permissions, and so on, without concerns that user's privacy will be violated. Today's collaborative systems are not amenable to rapid policy specification and modification, since data access policies are generally embedded in computation modules and user interface code.

Users must be able to have a high degree of confidence that the implementations of these policies are correct. Otherwise, users will abandon an application very quickly.

Collaborative systems, by their very nature, are highly concurrent. Users are typically represented as concurrent elements, whose behavior cannot be serialized without unduly constraining their actions. Such systems are notably hard to test because their components may interact in many unexpected ways. Traditional testing techniques are of limited help since test coverage is bound to be only a minute fraction of the possible behaviors of the system. Hence, these techniques do not provide sufficient confidence of the correctness of subtle and complex user policies.

Rapid, modular specification and modification of policies, even the complex policies described above, are achieved through the use of a collaborative architecture, one example of which is a Collaborative Objects Coordination Architecture (COCA). Testing for violations of policies specified in COCA is achieved by using a tool for systematically testing concurrent systems, one example, being VeriSoft, and through runtime specification based testing. Regarding VeriSoft, see an article authored by P. I. Godefroid entitled "Model Checking for Programming Languages using VeriSoft", *In ACM Symposium on Principles of Programming Languages* pages 174–186, January 1997, and U.S. Pat. application Ser. No. 09/083069, filed May 21, 1998, now U.S. Pat. No. 6,102,968 issued to C. Coby et al. on Aug. 15, 2000.

Referring now to FIG. 1, it shows, in simplified block diagram form, details of a collaborative communications system 100 in which the invention may advantageously be employed. The collaborative communications system 100 (hereinafter referred to as Presence Awareness (PA) system) of FIG. 1 includes the following functions.

It allows users to inquire about more sophisticated (and sensitive) kinds of presence information about others.

It allows users to dynamically specify their presence awareness policies, in order to control others' access to their own presence information.

Specifically, shown in FIG. 1 are collaborative infrastructure 101, user interface 102, a first group of user interfaces 103-1 through 103-N, a second group of user interfaces 104-1 through 104-Y and presence awareness (PA) database 105. Note that users of user interfaces 102, 103 and 104 are herein also referred to as user 102, a user 103 and a user 104. Thus, only one single user 102 and two groups of users, namely, 103-1 through 103-N and 104-1 through 104-Y, are shown for simplicity and clarity of exposition. It will be apparent that any desired number of so-called individual users and/or groups of users may utilize the collaborative system 100 including embodiments of the invention. Each of user interfaces 102, 103 and 104 includes one or more collaboration tools such as web browsers, a whiteboard, various audio/video (A/V) tools or the like to collaborate with each other. Additionally, the user interfaces may also include persistent memory units.

User interfaces 102, 103 and 104 of FIG. 1 support the following user activities.

Presence Information About a User May be Updated Explicitly Through User Actions, or Implicitly Through Sensors.

A user may explicitly update his presence information by logging in or logging out. The willingness to interact is iconified, for example, by the state of a door on the user's screen. An implicit presence awareness change may occur through sensors that detect and report the time-varying activities of a user, e.g., GPS (Global Positioning System) for user location tracking. In the Presence Awareness (PA) System 100 (FIG. 1), implicit presence awareness changes are modeled through a screen saver that reports user screen activities. For example, when a user has not been actively using input devices (e.g., mouse and keyboard) for a given period of time, a screensaver comes on. When the user touches some input device after a period of inactivity, the screensaver goes off. The screensaver off and on events are automatically generated by the user interface.

For these user activities, the user interface sends the following kinds of messages to the rest of the Presence Awareness System:

login, logout, screensaver(on), screensaver(off)

Users May Inquire About the Presence of Other Users.

For example, users may be interested in:

Login status of a user X, e.g. is X currently logged on and since when?

Screen saver status of X, e.g. is X's screen saver on or off, and since when?

Is X currently in a collaborative session, such as chat? Who are the other participants? How long has he or she been chatting?

What is the door status of X? What are the access rules and settings of X?

What is X's calendar, location, phone number, email address, etc.?

In some situations, e.g. a group discussion, anonymous participation often encourages contributions. All participants are anonymous by default, i.e., after a user X logs in, other participants only see a pseudo name unless the disclosure of X's real name is allowed explicitly by user X. Thus, users may be interested in finding out the real names of others.

For these user activities, the user interface sends the following kinds of messages to the rest of the system:

check-availability (X), check-name(X), check-chatters(X)

The messages received by the user interface from the rest of the Presence Awareness System are:

available(X), unavailable(X), name(real(X), pseudo(Y)), chatters(SID, SetOfChatters)

where each chat session is identified by a globally unique id "SID".

Users May Communicate With Other Users.

Users can interact with other users through collaborative communication, including for example, multi-party text chat. Users may initiate a collaborative communication session, invite others to join an existing session, request to participate in an existing session, accept or decline others' requests to join a session, or leave a session. Once a user becomes a participant in a collaborative communication session, he or she can send messages to other users (in a multi-party text chat, for example, these messages will appear on other participants' screen. Customized admission control policies dictate the rules for joining sessions; for example, it may require the session initiator's consent, or a vote of all participants that shows the consent of the majority.

Multiple collaborative sessions can be active simultaneously across the Presence Awareness system 100 users. For these activities, the user interface may send or receive the following kinds of messages from the rest of the Presence Awareness System:

invite(SID, Inviter, Invitees), apply(SID, X), accept(X, SID), reject(X, SID), message(SID, X,Text), leave(SID, X)

Users May Set/Modify Their Presence Awareness Policies.

This PA system 100 gives a user the capability to express his willingness to engage in casual interactions and to control which part of his private data can be accessed by whom. If the door is set open, then the user is ready for invitations to join collaborative sessions from any other users. If otherwise the door is closed, then in principle this user should not be interrupted by any invitations.

Exceptions exist however, and are critical for collaborations. For example, in a closely coupled work team, a user may give (some of) his colleagues the privilege to interrupt his even if his door is closed. Queries regarding the private data of a user, for example, whether the user is available, what is the real name of the user, the recent collaborative activities of the user can also be explicitly allowed or disallowed. All these motivate the specification of exception rules that are in the following form set(Condition→Action)

where Condition is a boolean expression and Action is an action expression. When it is in the form $p^{<i>}$ it means that user i can take action p. When it is in the form, $\neg p^{<i>}$ it means user i can not take action p. An exception rule as such means if Condition evaluates to true then Action is enabled. For example, rule door(closed)→invited$^{<j>}$ means even if the door of the user in question say i is closed, user j can send an invitation to i to join a collaborative session. Rule true→ $\neg$check(name, pseudo(i))$^{<j>}$ means under no circumstances should user j check the real name of user i by i's pseudonym. The right of access can be granted to individuals, set of designated users, user groups, even sets of users dynamically decided by a predicate.

To economize, one often defines implicit rules and explicit rules instead. For example, the implicit rule is, when the door of a user say X is open, in general, any other users can send X an invitation to join a collaborative session; and when X's door is closed, in general, nobody can send X the invitation. To explicitly exclude a user say j from sending an invitation to user i even if i's door is open, the following exception rule can be set door$^{<i>}$ (open)→$\neg$invite$^{<j>}$ And to explicitly grant j the permission to invite i even if i's door is closed, the exception rule can be set door$^{<i>}$ (closed)→$\neg$invite$^{<j>}$ A more sophisticated complex presence awareness policy, reciprocal permission, may say that j can invite i when i's door is closed given that i can invite j; a similar policy can be specified for finding out real names instead of pseudonyms.

For these user activities, the user interface sends out the following kinds of messages to the rest of the system:

set(door(open)), set(door(closed)), set(ExceptionRule)

The collaborative infrastructure 101 of FIG. 1 includes a presence awareness controller (PA Controller), namely, PA Controller 106 associated with user interface 102, PA Controllers 107-1 through 107-N associated with user interfaces 103-1 through 103-N, respectively, PA Controllers 108-1 through 108-Y associated with user 104-1 through 104-Y, respectively, and PA server 109 associated with PA database 105. Each PA Controller 106, 107 and 107 includes a processor implementing an inference engine, database and storage (role units) for storing presence awareness policy specifications. The database provides an associate memory for capturing and recording state information regarding the associated user during an ongoing collaboration. Additionally, the system allows run-time changes to the roles in collaboration, including modifications to the associated presence awareness policies.

PA Controllers 106, 107 and 108 handle the collaboration system 100 interaction among the participants, i.e., users 102, 103 and 104, respectively. PA Database 105 that stores awareness information such as users' private data, user activities, and awareness preference settings. PA Server 109 controls access to the PA Database 105. Note that specifying coordination policies is equivalent to defining the behavior of the PA Controller and the PA Server roles and how they coordinate with each other. Each PA Controller and/or PA Server has three so-called gates, i.e., channels: $g_{in}$ to receive messages from its associated user interface (or database), $g_{out}$ to send messages to its associated user interface (or database), and $g_{remote}$ to communicate messages with other PA Controllers and/or PA Servers. Since channel $g_{remote}$ is defined on the collaboration bus 110, it can be used to both send and receive.

Each of the PA Controllers 106, 107 and 108 specifies how a user interacts with other users through the Presence Awareness System 100. A PA Controller 106, 107 or 108 communicates and coordinates with other PA Controllers and the PA Server 109 for the user it represents. In particular, all the PA Controllers together form an intelligent middleware layer in the PA system 100. Some examples of its functionality follow:

- The PA Controller decides whether to forward certain messages either from the local user to other sites (other PA Controllers or the PA Server), or from remote sites to the local user interface, based on the local user's policies.
- Policies are specified by the user in the form of inference rules. The inference engine is part of the PA Controller. Upon receipt of a message from either the local user interface or from remote sites, the engine evaluates the inference rules for a match. The corresponding inference rule is then fired.
- The PA Controller usually "piggybacks" extra information on some messages, for example, digital signature to identify the sender and linear timestamps or vector timestamps to timestamp the messages.
- For efficiency, the PA Controller also buffers some (if not all) of the policy settings and the status of the local user. When the user is sending a command say to reset some policies, the new version is checked with the buffered old version, and only those that are different are forwarded to update the PA Server.

In the PA system 100, the PA Database 105 and PA Server 109 form a centralized database which stores all awareness information, such as all users' private data, users' activities, and awareness preferences settings. More specifically, the following data are included for all users:

- the time a user is logged on and logged out;
- the time a user's screen saver is activated and deactivated;
- the start time and end time of a collaborative session, who initiated the session, who are involved in the session, and who received the invitation but did not accept;
- a user's accessibility settings, for example, the user's willingness to engage in interactions (door status), who is allowed to see which part of the user private data, who can check the user's availability, who can only see the availability conclusion and who can see how the conclusion is reached as well, exception rules, and so forth.

When a user logs on to the Presence Awareness system 100, his or her previous anonymity and access settings are retrieved from the database. All the availability checking and notifications are performed by the database. For example, the four messages login, logout, screensaver(on), and screensaver(off) modify the availability of a participant. These messages are sent from a user interface to its PA Controller 106, 107 or 108, which passes them along to the PA Server 109. Upon receipt of any of these four messages, the PA Server 109 queries the PA Database 105 to determine the availability of the participant in question. In particular, a user is said to be available if and only if the user has not logged out since the last login, and either the screen saver has not gone on since the last time it went off or it has always been off.

The PA Server 109 stores the latest status of a user, and then notifies all participants of any update to anyone's availability status in accordance with the users' policies. When a user, for example 102, wants to check the availability of another user, for example 103, the PA Controller 106 for user 102 passes the request message to the PA Server 109. After querying the database, the PA Server 109 sends an available(user 103) or unavailable(user 103) message to user 102, depending on the actual availability of user 103 and in accordance with the policies of the user 102 and the user 103.

Figure 2:
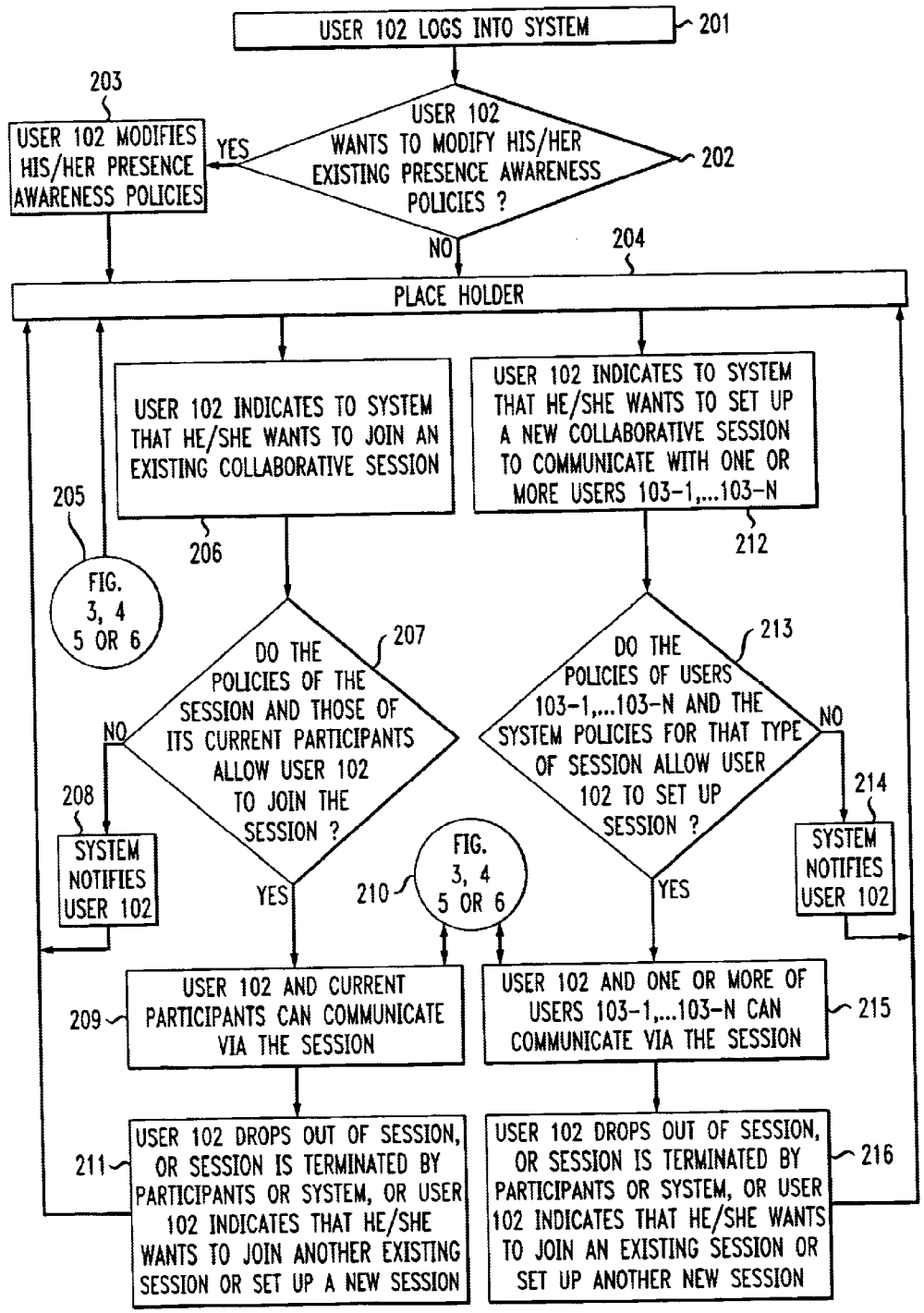
FIG. 2 is a flow diagram illustrating steps in processes employed in implementing embodiments of the invention.

FIG. 2 is a flow diagram illustrating steps in processes employed in implementing embodiments of the invention. Specifically, the processes are started in step 201 by, for example, user 102 logging into the system. That is the PA system 100 enables a prescribed user to log on. Then, step 202 tests to determine if user 102 wants to modify his/her existing presence awareness policies. If the test result in step 202 is YES, step 203 allows, i.e., enables, the user 102 to modify his/her presence awareness policies and control is passed to step 204. If the test result in step 202 is NO, control is passed directly to step 204. Step 204 is a so-called place-holder in the processes, i.e., a place waiting for some action to be taken. To this end, control may be transferred to step 205 where anyone of a number of sub-processes may be effected as shown in FIG. 3, 4, 5 or 6. Upon complete of the processes of step 205 control is returned to step 204.

Figure 3:
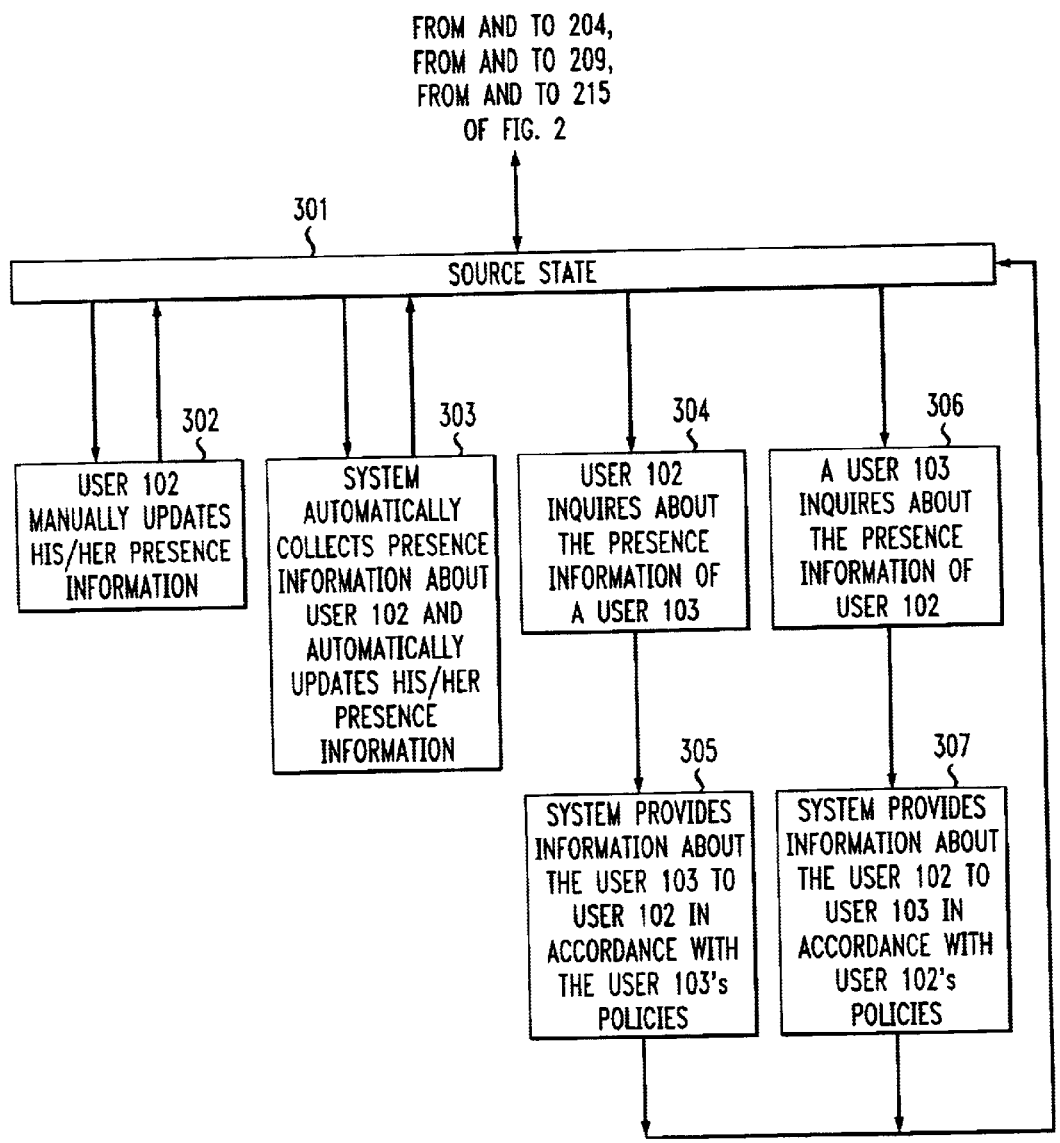
FIG. 3 is a flow diagram illustrating steps of possible processes employed in the embodiments of FIG. 2.

FIG. 3 is a flow diagram illustrating steps of possible sub-processes that may be employed in the embodiments of FIG. 2. Specifically, the processes are started in step 301 which is a so-called source state, i.e., an initial state, that could be, for example, the place-holder state 204 in FIG. 2. Thus, step 302 allows, i.e., enables, in this example, the user 102 to manually update his/her presence information. This presence information may include their door status, availability information, location, calendar information, phone number, email address, or the like. Then, control is returned to state 301. Step 303 causes the system to automatically collect presence information, in this example, about user 102 and automatically updates his/her presence information in accordance with the collected information. This information may include login status, screen saver status, information about which collaborative sessions user 102 is currently involved, or the like. Then, control is returned to state 301. Step 304 allows, i.e., enables, in this example, user 102, to inquire about the presence information of another user, for example, one of users 103-1 through 103-N. Then, in step 305 PA system 100 provides information about the particular user 103 to user 102 in accordance with the user 103's presence awareness policies. Thereafter, control is returned to state 301. Step 306 allows, i.e., enables, in this example, one of users 103-1 through 103-N, to inquire about the presence information of another user, for example, user 102. Then, in step 307 PA system 100 provides information about the user 102 to the particular user 103 in accordance with the user 102's presence awareness policies. Thereafter, control is returned to state 301. In steps 305 and/or step 307, the system may use specification-based testing at run-time to check that users' policies have not inadvertently been violated.

Figure 4:
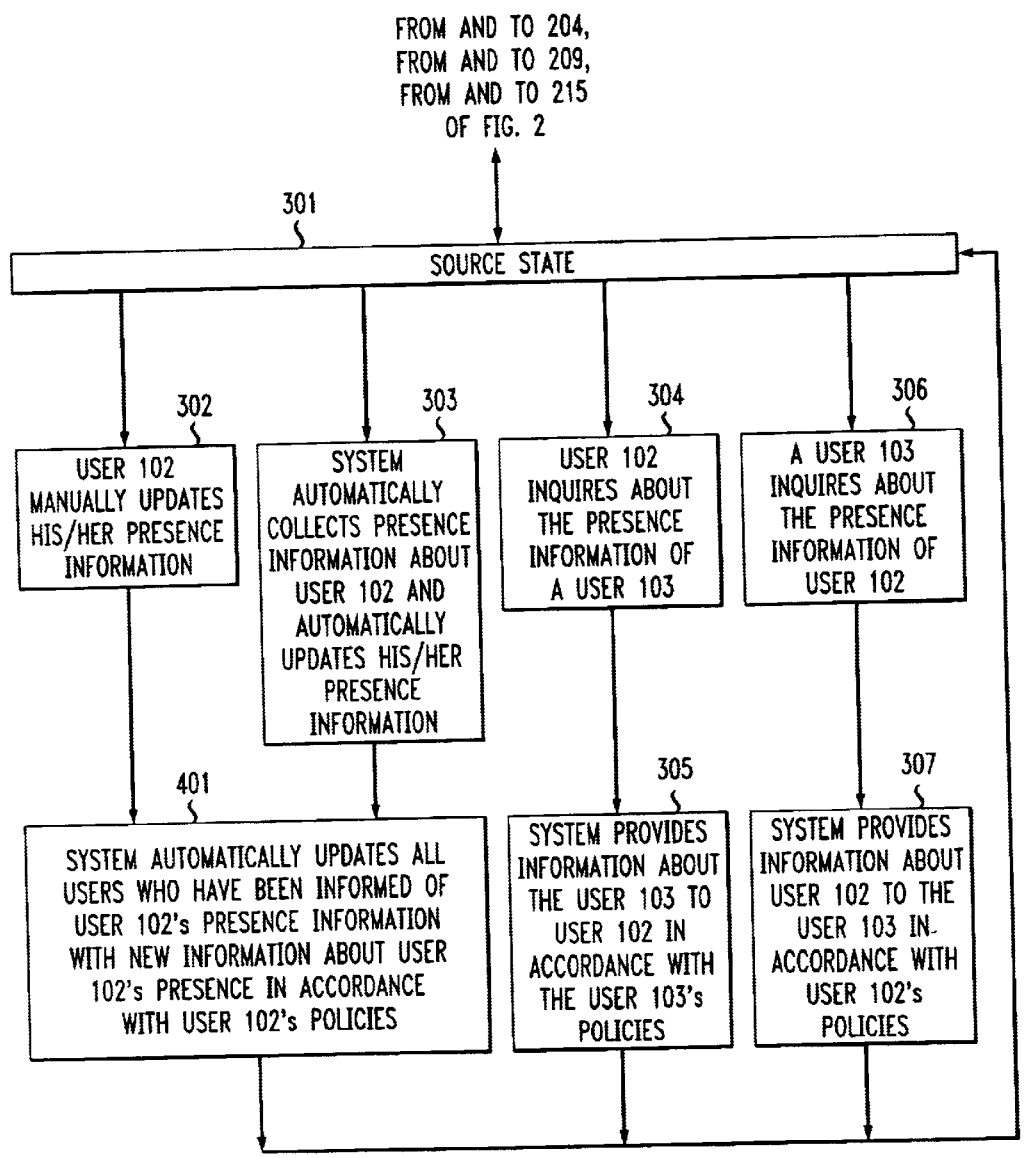
FIG. 4 is a flow diagram illustrating steps of possible processes which may be employed in the embodiments of FIG. 2.

FIG. 4 is a flow diagram illustrating steps of possible sub-processes that may be employed in the embodiments of FIG. 2. The steps in the sub-processes of FIG. 4 that are identical to those steps in FIG. 3 have been similarly numbered and will not be discussed again. As shown, after completion of either step 302 or step 303, control is transferred to step 401. Step 401 causes PA system 100 to automatically update all users that have been informed of, for example, user 102's presence information with new presence information about user 102's presence obtained in either of steps 302 or 303, in accordance with user 102's presence awareness policies. Thereafter, control is returned to state 301. In step 401, the system may use specification-based testing at run-time to check that users' policies have not inadvertently been violated.

FIG. 5 is a flow diagram illustrating steps of possible sub-processes that may be employed in the embodiments of FIG. 2. The steps in the sub-processes of FIG. 5 that are identical to those steps in FIG. 3 have been similarly numbered and will not be discussed again. Thus, step 501 allows, in this example, user 102 to manually modify his/her presence awareness policies or, alternatively, PA system 100 automatically modifies user 102's presence awareness policies in a manner pre-specified by user 102. Then, control is returned to state 301.

FIG. 6 is a flow diagram illustrating steps of possible processes that may be employed in the embodiments of FIG. 2. The steps in the sub-processes of FIG. 6 that are identical to those steps in FIG. 4 and FIG. 5 have been similarly numbered and will not be discussed again. Thus, on the completion of step 501 control is transferred to step 601. Step 601 causes PA system 100 to automatically update all users that have been informed of, for example, user 102's presence information with new presence information about user 102's presence obtained in either of steps 302, 303 and 501, in accordance with user 102's presence awareness policies. Thereafter, control is transferred to state 301. In step 601, the system may use specification-based testing at run-time to check that users' policies have not inadvertently been violated.

Returning to FIG. 2, in step 206, user 102 indicates to PA system 100 via user interface 102 that he/she wants to join an existing collaborative session. Step 207 tests to determine if the policies of the existing session and those of the current participants in the session allow user 102 to join, i.e., participate, in the session. If the test result in step 207 is NO, step 208 so notifies user 102 and control is returned to step 204. If the test result in step 207 is YES, control is transferred to step 209, and AP system 100 is caused to allow, i.e., enable, user 102 and current participants in the ongoing session to communicate via the session. In step 209, the system may use specification-based testing at run-time to check that users' policies have not inadvertently been violated. While in step 209 control may be transferred to step 210, and either of the sub-processes shown in FIG. 3, 4, 5 or 6 may be employed therein. It should be noted, however, the sub-process employed in step 210 will be the same sub-process that is employed in step 205, and described above. That is, if the sub-process shown in FIG. 3 is employed in step 205 the same sub-process is employed in step 210. The same is true for the sub-processes shown in FIGS. 4, 5 and 6. After completing the sub-process in step 210 control is return to step 209 and the session continues until some other indication occurs. Step 211 will cause PA system 100 to return control back to step 204 if, in this example, user 102 drops out of the ongoing session, or the current session is terminated by the participants or PA system 100, or user 102 indicates that he/she wants to join another existing session, or user 102 indicates that he/she wants to set up a new session. Then, control is returned to step 204, where appropriate action is initiated by PA system 100. That is, PA system 100 causes either steps 205 through 211 to be effected in joining another existing session, or steps 205, 212 though 215, 210 and 216 to be effected to set a new session.

While in step 204, user 102 in this example, in step 212 may indicate to PA system 100 that he/she wants to set up a new collaborative session to communicate with, for example, one or more of users 103-1 through 103-N. Then, step 213 tests to determine if the policies of the one or more of users 103-1 through 103-N and the PA system 100 policies for that type of session allow user 102 to set up such a session. If the test result in step 213 is NO, step 214 so notifies user 102 and control is returned to step 204. If the test result in step 213 is YES, control is transferred to step 215. Step 215 causes PA system 100 to allow, i.e., enable, in this example, user 102 and one or more of users 103-1 through 103-N to communicate via the session. In step 215, the system may use specification-based testing at run-time to check that users' policies have not inadvertently been violated. While in step 215 control may be transferred to step 210, and either of the sub-processes shown in FIG. 3, 4, 5 or 6 may be employed therein. It should be noted, however, the sub-process employed in step 210 will be the same subprocess that is employed in step 205, and described above. That is, if the sub-process shown in FIG. 3 is employed in step 205 the same sub-process is employed in step 210. The same is true for the sub-processes shown in FIGS. 4, 5 and 6. After completing the sub-process in step 210 control is returned to step 215 and the session continues until some other indication occurs. Step 216 will cause PA system 100 to return control back to step 204 if, in this example, user 102 drops out of the ongoing session, or the current session is terminated by the participants or PA system 100, or user 102 indicates that he/she wants to join an existing session, or user 102 indicates that he/she wants to set up another new session. Then, control is returned to step 204, where the appropriate action is initiated by PA system 100. That is, PA system 100 causes either steps 205 through 211 to be effected in joining an existing session, or steps 205, 212 though 215, 210 and 216 to be effected to set another new session.

The above-described embodiments are, of course, merely illustrative of the principles of the invention. Indeed, numerous other methods or apparatus may be devised by those skilled in the art without departing from the spirit and scope of the invention.

What is claimed is:

1. A method for use in collaborative systems to effect presence awareness comprising the steps of:

enabling a prescribed user to log on to a presence awareness system including presence awareness policies of one or more users;

receiving an indication from said prescribed user that he/she wants to join an existing collaborative session including one or more current users;

determining whether said presence awareness policies of said existing session and those of said current users in said existing session allow said prescribed user to join said existing session, if so, enabling said prescribed user and said current users to communicate via said session, otherwise, notifying said prescribed user that he/she cannot join said existing session;

determining whether said prescribed user wants to modify his/her presence awareness policies, prior to or any time after joining said existing session;

if it is determined that said prescribed user wants to modify his/her presence awareness policies, further including the step of enabling said prescribed user to modify his/her presence awareness policies, prior to and any time after joining said existing session; and employing a systematic state-space exploration tool to analyze substantially all possible concurrent behaviors of the system in order to verify substantially all possible specifiable presence awareness policies thereby establishing a relatively high degree of assurance that said presence awareness system can correctly implement substantially all of said specifiable presence awareness policies prior to use of the system application.

2. The method as defined in claim 1 further including a step of enabling a particular user to initiate joining another existing collaborative session while in said current session.

3. The method as defined in claim 1 further including a step of enabling a particular user to initiate setting up a new collaborative session with a set of one or more users while in said current session.

4. The method as defined in claim 1 further including the step of enabling a particular user to manually update his/her presence information, at any time after joining said existing session.

5. The method as defined in claim 4 further including the step of automatically updating users who have been informed of said particular user's presence information with any new updated presence information about said particular user in accordance with said particular user's presence awareness policies.

6. The method as defined in claim 5 further including a step of performing specification based presence awareness policy testing in background while said system is running and presence awareness policy violations are being reported to determine whether said presence awareness system correctly implements substantially all of said specifiable presence awareness policies.

7. The method as defined in claim 1 further including steps of automatically collecting presence information about a particular user and automatically updating said presence awareness information for said particular user, at any time after joining said existing session.

8. The method as defined in claim 7 further including a step of automatically updating users who have been informed of said particular user's presence information with any new updated presence information about said particular user in accordance with said particular user's presence awareness policies.

9. The method as defined in claim 8 further including a step of performing specification based presence awareness policy testing in background while said system is running and presence awareness policy violations are being reported to determine whether said presence awareness system correctly implements substantially all of said specifiable presence awareness policies.

10. The method as defined in claim 1 further including steps of enabling users to inquire about presence information of other users and providing an inquiring user presence information of a particular user in accordance with said particular user's presence awareness policies, at any time during said existing session.

11. The method as defined in claim 10 further including a step of performing specification based presence awareness policy testing in background while said system is running and presence awareness policy violations are being reported to determine whether said presence awareness system correctly implements substantially all of said specifiable presence awareness policies.

12. The method as defined in claim 1 further including a step of automatically updating users who have been informed of said particular user's presence information with any new updated presence information about said particular user in accordance with said particular user's presence awareness policies.

13. The method as defined in claim 12 further including a step of performing specification based presence awareness policy testing in background while said system is running and presence awareness policy violations are being reported to determine whether said presence awareness system correctly implements substantially all of said specifiable presence awareness policies.

14. The method as defined in claim 1 further including a step of automatically modifying a particular user's presence awareness policies in a manner pre-specified by said particular user, at any time after joining existing said session.

15. The method as defined in claim 14 further including a step of automatically updating users who have been informed of said particular user's presence information with any new updated presence information about said particular user in accordance with said particular user's presence awareness policies.

16. The method as defined in claim 15 further including a step of performing specification based presence awareness policy testing in background while said system is running and presence awareness policy violations are being reported to determine whether said presence awareness system correctly implements substantially all of said specifiable presence awareness policies.

17. A method for use in collaborative systems to effect presence awareness comprising the steps of:
  enabling a prescribed user to log on to a presence awareness system including presence awareness policies of said prescribed user and one or more other users;
  receiving an indication from said prescribed user that he/she wants to set up a new collaborative session including a set of one or more other users;
  determining whether said presence awareness policies of said set of one or more other users and said presence awareness system policies for the type of collaborative session to be set up allow said prescribed user to set up said new session,
  if so, enabling said prescribed user and said set of users to communicate via said session,
  otherwise, notifying said prescribed user that he/she cannot set up said new session;
  determining whether said prescribed user wants to modify his/her presence awareness policies, prior to or any time after joining said new session;
  if it is determined that said prescribed user wants to modify his/her presence awareness policies, further including the step of enabling said prescribed user to modify his/her presence awareness policies, prior to and after joining said new session; and
  employing a systematic state-space exploration tool to analyze substantially all possible concurrent behaviors of the system in order to verify substantially all possible specifiable presence awareness policies thereby establishing a relatively high degree of assurance that said presence awareness system can correctly implement substantially all of said specifiable presence awareness policies prior to use of the system application.

18. The method as defined in claim 17 further including a step of enabling a particular user to initiate joining another existing collaborative session while in said current session.

19. The method as defined in claim 17 further including a step of enabling a particular user to initiate setting up a new collaborative session with a set of one or more other users while in said current session.

20. The method as defined in claim 17 further including the step of enabling a particular user to manually update his/her presence information at any time after joining said new session.

21. The method as defined in claim 20 further including the step of automatically updating users who have been informed of said particular user's presence information with any new updated presence information about said particular user in accordance with said particular user's presence awareness policies.

22. The method as defined in claim 21 further including a step of performing specification based presence awareness policy testing in background while said system is running and presence awareness policy violations are being reported to determine whether said presence awareness system correctly implements substantially all of said specifiable presence awareness policies.

23. The method as defined in claim 17 further including steps of automatically collecting presence information about a particular user and automatically updating said presence awareness information for said particular users at any time after joining said new session.

24. The method as defined in claim 23 further including a step of automatically updating users who have been informed of said particular user's presence information with any new updated presence information about said particular user in accordance with said particular user's presence awareness policies.

25. The method as defined in claim 24 further including a step of performing specification based presence awareness policy testing in background while said system is running and presence awareness policy violations are being reported to determine whether said presence awareness system correctly implements substantially all of said specifiable presence awareness policies.

26. The method as defined in claim 17 further including steps of enabling users to inquire about presence information of other users and providing an inquiring user presence information of a particular user in accordance with said particular user's presence awareness policies, at any time after joining said new session.

27. The method as defined in claim 26 further including a step of performing specification based presence awareness policy testing in background while said system is running and presence awareness policy violations are being reported to determine whether said presence awareness system correctly implements substantially all of said specifiable presence awareness policies.

28. The method as defined in claim 17 further including a step of automatically updating users who have been informed of said particular user's presence information with any new updated presence information about said particular user in accordance with said particular user's presence awareness policies.

29. The method as defined in claim 28 further including a step of performing specification based presence awareness policy testing in background while said system is running and presence awareness policy violations are being reported to determine whether said presence awareness system correctly implements substantially all of said specifiable presence awareness policies.

30. The method as defined in claim 17 further including a step of automatically modifying a particular user's presence awareness policies in a manner pre-specified by said particular user, at any time after joining said new session.

31. The method as defined in claim 30 further including a step of automatically updating users who have been informed of said particular user's presence information with any new updated presence information about said particular user in accordance with said particular user's presence awareness policies.

32. The method as defined in claim 31 further including a step of performing specification based presence awareness policy testing in background while said system is running and presence awareness policy violations are being reported to determine whether said presence awareness system correctly implements substantially all of said,specifiable presence awareness policies.

33. Apparatus for use in collaborative systems to effect presence awareness comprising:
   a user interface for enabling a prescribed user to log on to a presence awareness system including presence awareness policies of one or more users by a prescribed user and for indicating to said presence awareness system that said prescribed user wants to join an existing collaborative session including one or more current users;
   a controller for determining whether said presence awareness policies of said existing session and those of said current users in said session allow said prescribed user to join said existing session,
   if so, for enabling said prescribed user and said current users to communicate via said session,
   otherwise, for notifying said prescribed user that he/she cannot join said existing session,
   for determining whether said prescribed user wants to modify his/her presence awareness policies,
   if so, for enabling said prescribed user to modify his/her presence awareness policies, prior to and anytime after joining said existing session; and
   a state-space exploration tool to systematically analyze substantially all possible concurrent behaviors of the system in order to verify substantially all possible specifiable presence awareness policies thereby establishing a relatively high degree of assurance that said presence awareness system can correctly implement substantially all of said specifiable presence awareness policies prior to use of the system application.

34. The invention as defined in claim 33 wherein said controller is further equipped to enable a particular user to initiate joining another existing collaborative session while in said current session.

35. The invention as defined in claim 33 wherein said controller is further equipped to enable a particular user to initiate setting up a new collaborative session with a set of one or more users while in said current session.

36. The invention as defined in claim 33 wherein said controller is further equipped to automatically update users who have been informed of said particular user's presence information with any new updated presence information about said particular user in accordance with said particular user's presence awareness policies.

37. The invention as defined in claim 36 wherein said controller is further equipped to perform specification based presence awareness policy testing in background while said system is running and presence awareness policy violations are being reported to determine whether said presence awareness system correctly,implements substantially all of said specifiable presence awareness policies.

38. The invention as defined in claim 33 wherein said controller is further equipped to automatically collect presence information about a particular user and to automatically update said presence awareness information for said particular user, at any time after joining said existing session.

39. The invention as defined in claim 38 wherein said controller is further equipped to automatically update users who have been informed of said particular user's presence information with any new updated presence information about said particular user in accordance with said particular user's presence awareness policies.

40. The invention as defined in claim 39 wherein said controller is further equipped to perform specification based presence awareness policy testing in background while said system is running and presence awareness policy violations are being reported to determine whether said presence awareness system correctly implements substantially all of said specifiable presence awareness policies.

41. The invention as defined in claim 33 wherein said controller is further equipped to enable users to inquire about presence information of other users and to provide an inquiring user presence information of a particular user in accordance with said particular user's presence awareness policies, at any time during said existing session.

42. The invention as defined in claim 41 wherein said controller is further equipped to perform specification based presence awareness policy testing in background while said system is running and presence awareness policy violations are being reported to determine whether said presence awareness system correctly implements substantially all of said specifiable presence awareness policies.

43. The invention as defined in claim 33 wherein said controller is further equipped to automatically update users who have been informed of said particular user's presence information with any new updated presence information about said particular user in accordance with said particular user's presence awareness policies.

44. The invention as defined in claim 43 wherein said controller is further equipped to perform specification based presence awareness policy testing in background while said system is running and presence awareness policy violations are being reported to determine whether said presence awareness system correctly implements substantially all of said specifiable presence awareness policies.

45. The invention as defined in claim 33 wherein said controller is further equipped to automatically modify a particular user's presence awareness policies in a manner pre-specified by said particular user, at any time after joining said existing session.

46. The invention as defined in claim 45 wherein said controller is further equipped to automatically update users who have been informed of said particular user's presence information with any new updated presence information about said particular user in accordance with said particular user's presence awareness policies.

47. The invention as defined in claim 46 wherein said controller is further equipped to perform specification based presence awareness policy testing in background while said system is running and presence awareness policy violations are being reported to determine whether said presence awareness system correctly implements substantially all of said specifiable presence awareness policies.

48. Apparatus for use in collaborative systems to effect presence awareness comprising:
a user interface for enabling a prescribed user to log on to a presence awareness system including presence awareness policies of one or more users by a prescribed user and for indicating to said presence awareness system that said prescribed user wants to set up a new collaborative session including a set of one or more other users;
a controller for determining whether said presence awareness policies of said set of one or more other users and said presence awareness system policies for the type of collaborative session to be set up allow said prescribed user to set up said new session,
if so, for enabling said prescribed user and said current users to communicate via said new session,
otherwise, for supplying an output notifying said prescribed user that he/she cannot set up said new session,
said controller being further equipped to determine whether said prescribed user wants to modify his/her presence awareness policies, prior to or any time after joining
if so, for enabling said prescribed user to modify his/her presence awareness policies, prior to and after joining said new session; and
a state-space exploration tool to systematically analyze substantially all possible concurrent behaviors of the system in order to verify substantially all possible specifiable presence awareness policies thereby establishing a relatively high degree of assurance that said presence awareness system can correctly implement substantially all of said specifiable presence awareness policies prior to use of the system application.

49. The invention as defined in claim 48 wherein said controller is further equipped to enable a particular user to initiate joining an existing collaborative session while in said current session.

50. The invention as defined in claim 48 wherein said controller is further equipped to enable a particular user to initiate setting up a new collaborative session with a set of one or more users while in said current session.

51. The invention as defined in claim 48 wherein said controller is further equipped to automatically update users who have been informed of said particular user's presence information with any new updated presence information about said particular user in accordance with said particular user's presence awareness policies.

52. The invention as defined in claim 51 wherein said controller is further equipped to perform specification based presence awareness policy testing in background while said system is running and presence awareness policy violations are being reported to determine whether said presence awareness system correctly, implements substantially all of said specifiable presence awareness policies.

53. The invention as defined in claim 48 wherein said controller is further equipped to automatically collect presence information about a particular user and to automatically update said presence awareness information for said particular user, at any time after joining said new session.

54. The invention as defined in claim 53 wherein said controller is further equipped to automatically update users who have been informed of said particular user's presence information with any new updated presence information about said particular user in accordance with said particular user's presence awareness policies.

55. The invention as defined in claim 54 wherein said controller is further equipped to perform specification based presence awareness policy testing in background while said system is running and presence awareness policy violations are being reported to determine whether said presence awareness system correctly implements substantially all of said specifiable presence awareness policies.

56. The invention as defined in claim 48 wherein said controller is further equipped to enable users to inquire about presence information of other users and to provide an inquiring user presence information of a particular user in accordance with said particular user's presence awareness policies, at any time after joining said new session.

57. The invention as defined in claim 56 wherein said controller is firer equipped to perform specification based presence awareness policy testing in background while said system is running and presence awareness policy violations are being reported to determine whether said presence awareness system correctly implements substantially all of said specifiable presence awareness policies.

58. The invention as defined in claim 48 wherein said controller is further equipped to automatically update users who have been informed of said particular user's presence information with any new updated presence information about said particular user in accordance with said particular user's presence awareness policies.

59. The invention as defined in claim 58 wherein said controller is further equipped to perform specification based presence awareness policy testing in background while said system is running and presence awareness policy violations are being reported to determine whether said presence awareness system correctly implements substantially all of said specifiable presence awareness policies.

60. The invention as defined in claim 48 wherein said controller is further equipped to automatically modify a particular user's presence awareness policies in a manner pre-specified by said particular user, at any time after joining said new session.

61. The invention as defined in claim 60 wherein said controller is further equipped to automatically update users who have been informed of said particular user's presence information with any new updated presence information about said particular user in accordance with said particular user's presence awareness policies.

62. The invention as defined in claim 61 wherein said controller is further equipped to perform specification based presence awareness policy testing in background while said system is running and presence awareness policy violations are being reported to determine whether said presence awareness system correctly implements substantially all of said specifiable presence awareness policies.

63. Apparatus for use in collaborative systems to effect presence awareness comprising:

means for enabling a prescribed user to log on to a presence awareness system including complex presence awareness policies of said prescribed user and one or more other users;

means for receiving an indication from said prescribed user that he/she wants to set up a collaborative session including a set of one or more other users;

means for determining whether said complex presence awareness policies of said set of one or more other users and said presence awareness system policies for the type of new collaborative session to be set up allow said prescribed user to set up said new session;

means responsive to the results of said determining for enabling said prescribed user and said set of users to communicate via said new session;

means responsive to the results of said determining for otherwise notifying said prescribed user that he/she cannot set up said new session;

means for determining whether said prescribed user wants to modify his/her presence awareness policies, prior to or any time after joining said new session;

means responsive to a determination that said prescribed user wants to modify his/her presence awareness policies, further including means for enabling said prescribed user to modify his/her presence awareness policies, prior to and after joining said new session; and a state-space exploration tool to systematically analyze substantially all possible concurrent behaviors of the system in order to verify substantially all possible specifiable presence awareness policies thereby establishing a relatively high degree of assurance that said presence awareness system can correctly implement substantially all of said specifiable presence awareness policies prior to use of the system application.

\* \* \* \* \*